United States Patent
Montgomery

[11] 3,755,271
[45] Aug. 28, 1973

[54] COMPATIBLE AND REACTIVE VINYL COPOLYMER RESN

[75] Inventor: Donald R. Montgomery, Charleston, W. Va.

[73] Assignee: Union Carbide Corporation, New York, N.Y.

[22] Filed: Nov. 19, 1971

[21] Appl. No.: 200,569

[52] U.S. Cl. ............... 260/80.75, 260/16, 260/17 R, 260/32.8 R, 260/77.5 AP, 260/859 PV, 117/155 UA, 117/157
[51] Int. Cl. ............................................. C08f 15/40
[58] Field of Search ................................. 260/80.75

[56] References Cited
FOREIGN PATENTS OR APPLICATIONS
1,097,613    1/1968    England ........................... 260/80.75

*Primary Examiner*—Joseph L. Schofer
*Assistant Examiner*—Stanford M. Levin
*Attorney*—Paul A. Rose et al.

[57] ABSTRACT

A terpolymer of vinyl chloride, vinyl acetate and an acrylic ester having the formula:

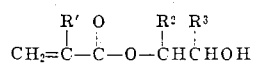

wherein $R'$, $R^2$ and $R^3$ may be hydrogen and methyl, in which the vinyl chloride mer content is about 50 to about 69 weight percent, based on the terpolymer weight, the acrylic ester mer content is about 2 weight percent to about 18 weight percent, based on the terpolymer weight, and the vinyl acetate mer content is at least 25 weight percent, based on the terpolymer weight, and said terpolymer has an inherent viscosity of about 0.15 to about 0.5, determined at 30° C using 0.2 grams of the terpolymer in a deciliter of cyclohexanone. These terpolymer resins can be employed alone or in admixture with other resins (such as nitrocellulose and polyurethanes) to make useful coatings.

1 Claim, No Drawings

COMPATIBLE AND REACTIVE VINYL COPOLYMER RESN

Vinyl chloride polymers have been used for a long time in the manufacture of coatings, generally as paints, varnishes and the like. These polymers are typically interpolymers, that is, made from vinyl chloride and at least one other ethylenically unsaturated monomer, such as vinyl acetate, partially hydrolyzed vinyl acetate (as formed within the polymer to produce a terpolymer), maleic acid, and the like. With the exception of the copolymer of vinyl chloride and vinyl acetate containing 40 weight percent vinyl acetate, which was marketed commercially for only a few years, none of the vinyl polymer resins are compatible with nitrocellulose.

This point is significant, since compatibility of the vinyl polymers with nitrocellulose provides a substantial advantage. Nitrocellulose is the most widely employed resin in the manufacture of lacquers. It is a relatively hard, brittle resin which can be plasticized and also modified by other resins to produce films having desirable properties. It is employed as a resin solution having fast-dry lacquer properties due to its ability to quickly release the solvents employed.

Since the vinyl polymers are employed with solvents, they also dry in the same manner as nitrocellulose lacquers, that is, by evaporation of the solvement to deposit a film of the resin on the surface. Therefore, the utilization of these polymers with nitrocellulose could provide substantial benefits. For example, the vinyl resins are typically less expensive than the nitrocellulose resin and, hence, their inclusion in a nitrocellulose resin formulation would lower the cost of such a formulation. However, such a use of vinyl resins with a consequent reduction in properties of the resulting film or coating would not necessarily be an advantage.

A significant factor in the utilization of vinyl chloride interpolymers in nitrocellulose formulations is the degree of compatibility of the interpolymers with other film-forming aids which are incorporated in the typical nitrocellulose coating composition. For example, there are employed alkyd resins of the oxidizing types, which are film-formers, and of the non-oxidizing types which are not film-formers. Alkyd resins when corporated in nitrocellulose coating compositions enhance the adhesion qualities of the film, provide films having better body, and serve as a plasticizer for the nitrocellulose. There is also provided in the coating composition plasticizers, such as the conventional phthalate ester plasticizers, which serve to control film properties such as toughness and flexibility. They are usually the lowest cost modifiers employed in the nitrocellulose composition. Another class of ingredients added to nitrocellulose formulations are hard resins or rosins which are used to increase the body of the film and its gloss and improve handling properties, especially sandability.

Nitrocellulose is also employed in cross-linking systems that give films having improved resistance to solvents, chemicals and stains as compared to the lacquers. A crosslinkable nitrocellulose finish would generally contain the nitrocellulose resin, and alkyd resin and a co-reactant, such as a urea-formaldehyde or melamine-formaldehyde resin or an isocyanato containing urethane resin. Though plasticizers and hard resins or rosins could be added to such formulations, they are usually not employed because they detract from the overall performance characteristics of the film.

From the above, it is quite apparent that the object herein is to provide vinyl chloride interpolymers which can be employed broadly in nitrocellulose containing compositions and possess utility in and of themselves as useful film-formers. The vinyl chloride interpolymers of this invention are not only compatible with nitrocellulose, therefore, are suitably employable therewith in the manufacture of lacquers, they are also readily compatible with the other additives to the usual nitrocellulose compositions such as the plasticizers, the hard resins and rosins, and the like and are generally compatible with alkyd resins in admixture with nitrocellulose. In addition, the vinyl chloride interpolymers of this invention can be very satisfactorily employed in crosslinkable nitrocellulose compositions because they can be used to increase the crosslink density of the film by virtue of the presence in the vinyl chloride interpolymers of this invention of reactive functional groups capable of interpolymerization by interaction with other functional groups in the mixture.

The vinyl chloride interpolymers of this invention are resinous terpolymers of vinyl chloride, vinyl acetate and an acrylic ester of the formula:

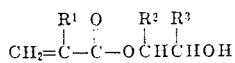

wherein R', R² and R³ may be hydrogen and methyl. The proportions of each termonomer is important in providing the various properties cited herein. The vinyl chloride mer content is present in an amount from about 50 to about 69 weight percent, based on the weight of the terpolymer. The acrylic ester mer content may be as low as about 2 weight percent and may be as high as about 18 weight percent, based on the weight of the terpolymer. The remainder of the terpolymer weight is from vinyl acetate mers, however, the vinyl acetate content of the terpolymer is preferably in excess of about 25 weight percent of the weight thereof. When the vinyl acetate content is less than about 25 weight percent, the terpolymer has less than the desired compatibility with other resins, particularly nitrocellulose.

The terpolymers of this invention can be coreacted with isocyanate containing urethane prepolymers to form excellent crosslinked films. Illustrative isocyanate containing urethanes suitable for cross-linking the terpolymers of this invention are made by reacting a polyol with a stoichiometric excess of a polyisocyanate, that is, the resulting urethane reaction product contains free isocyanato groups. Such urethanes are usually called "polyurethane prepolymers" by the trade. For example, a polyether diol or polyester diol is reacted with a diisocyanate in a mole ratio of diol to diisocyanate of less than 1. The resulting polymer possesses unreacted isocyanato groups at the terminal portion of the polymer. One can effect the same reaction with a triol and/or tetrol with a diisocyanate or triisocyanate, etc. Such technology is well known.

The terpolymers of this invention are made by conventional free-radical polymerization techniques. The polymerization may be carried out by the conventional suspension, emulsion or solution techniques. The most desirable method for making the terpolymer is by solution polymerization. This is achieved in a solvent for the resulting terpolymer as well as the monomers employed in making it. Suitable solvents are the conventional ester solvents such as butyl acetate, ethyl acetate, isopropyl acetate, n-propyl acetate, and the like, as well as the ketone solvents such as methyl ethyl ketone, methyl-n-butyl ketone, methyl isopropyl ketone, and the like. The process employed for making the terpolymer of this invention is not critical and such technology is well understood by those in the art. It is preferred, however, to carry out the process in such a manner as to promote compositional uniformity in the terpolymer structure. Illustrative of the procedure for making such terpolymers is the following polymerization example:

Vinyl chloride (224 grams), vinyl acetate (320 grams), beta-hydroxypropyl acrylate (16 grams) and isopropyl acetate (1040 grams) were charged to a 2-liter stainless steel autoclave and the temperature raised to 69° C. An initial feed stream of 12 grams of a 5 weight percent solution of isopropyl peroxydicarbonate initiator in isopropyl acetate was provided to the autoclave and thereafter the stream was added at a rate of 12 grams per hour. When polymerization started, a mixture of 510 grams of vinyl chloride, 280 grams of vinyl acetate, and 60 grams of hydroxypropyl acrylate was fed to the autoclave at a rate equal to the rate of conversion of monomers to polymer in order to maintain constant monomer to monomer ratios and monomers to solvent ratio in the autoclave. When the monomer feed was completed the unreacted monomers were stripped from the varnish by conventional techniques and the contained resin solids adjusted to 40 percent by addition of solvent.

The various terpolymers described hereinafter were made by the above technique, and the amounts of each different type of mer within the terpolymer was controlled by the amount employed in effecting the reaction, based on coordinating the feed rate of each reactant with its respective rate of polymerization. The technique for the manufacture of the terpolymer is not a part of this invention.

As pointed out above, the terpolymers of this invention most desirably possess a minimum amount of vinyl acetate derived mers in the terpolymer. Such is necessary in order to effect the requisite compatibility with nitrocellulose and this provides an overall utility factor not heretofore obtainable from terpolymers having the same mers in its construction but in different proportions, see British Pat. No. No. 1,097,613.

In the preferred use of the terpolymers of this invention, they are employed in a solvent solution of an active solvent such as described above with respect to polymer manufacture.

Another factor significant in the utilization of the vinyl terpolymers of this invention is molecular weight. Molecular weight of the terpolymer has been found to be a factor which determines its compatibility with other resins such as nitrocellulose and isocyanato containing polyurethanes. Defining molecular weight in terms of the terpolymer's viscosity, the terpolymers of this invention desirably contain an inherent viscosity of about 0.15 to about 0.5 determined by dissolving 0.2 grams of resin in a deciliter of cyclohexanone and measured at 30° C. Too low an inherent viscosity results in poor film properties and too high an inherent viscosity will adversely affect the ability to effectively blend the terpolymer with nitrocellulose resins in making lacquers.

The terpolymers of this invention can be employed in a variety of coating formulations with a variety of resins such as urea-formaldehyde, melamineformaldehyde resins, alkyd resins, nitrocellulose, urethane resins, and the like. Standard formulating techniques may be employed in the utilization of these terpolymers.

The following examples describe the manufacture of coating compositions in which, with stirring, the components recited in each example were blended to form the coating compositions characterized.

EXAMPLE 1

Use of the terpolymer with nitrocellulose as paper coatings.

| | % by wt., dry basis[2] | | | |
|---|---|---|---|---|
| RSNC ½ sec. | 100 | - | 50 | 33 |
| Vinyl terpolymer resin[1] | - | 100 | 50 | 67 |
| Minimum heat seal temperature at 20 psi, 0.4 sec. | >450°F. | 275°F. | >450°F. | 400°F. |
| Gloss | 33 | 45 | 38 | 42 |
| Blocking test at | | | | |
| 3psi, 140°F. 1 hr. | Pass | Pass | Pass | Pass |
| 5psi, 160°F. 24 hrs. | Pass | Fail | Pass | Slight | where: Pass means coating did not adhere to another coating sample, under the test conditions. Fail means coating adhered to another coating sample, under the test conditions.

1. A terpolymer of 59 weight percent vinyl chloride, 8.9 weight percent beta-hydroxypropylacrylate, 32.1 weight percent vinyl acetate having an inherent viscosity of 0.34.
2. Where nitrocellulose (RSNC 1/2 sec.) was employed alone, it was dissolved in a 90 weight % acetone/10 weight % ethanol mixture. Where vinyl terpolymer resin was employed alone, it was dissolved in a 50 weight% acetone/50 weight % isopropyl acetate mixture. Where the nitrocellulose and the vinyl terpolymer resin were blended, the solvents were 70 weight % acetone, 5 weight % ethanol and 25 weight percent isopropyl acetate. All of the solvent solutions were 20 weight % solids.

EXAMPLE 2

Use of the terpolymers with nitrocellulose to make a furniture lacquer:

FORMULATIONS

| | A[2] | B[3](Control) |
|---|---|---|
| | % by weight, dry basis | |
| RSNC 1/2 sec | 35 | 50 |
| Vinyl terpolymer resin[1] | 15 | - |
| Coconut alkyd resin | 40 | 40 |
| Dioctyl phthalate | 10 | 10 |
| Solids content at 22 secs. 4 Ford Cup | 20.2% | 18.2% |
| Sward Hardness | 107 | 108 |
| Print Test: | | |
| 1/2 psi, 4 hrs., 140°F. | No Print | No Print |
| 1/2 psi, 4 hrs., 120°F. | No Print | No Print |
| 1/2 psi, 18 hrs., 75°F. | No Print | No Print |
| 17 Hour Resistance to: | | |
| Alcohol, 50% | No Effect | No Effect |
| Acetic acid, 5% | No Effect | No Effect |
| Merthiolate | No Effect | No Effect |
| NaOH, 10% | Slight etch of Surface | severe etch of Surface |

1. A terpolymer of 59 weight percent vinyl chloride, 8.9 weight percent gamma-hydroxypropylacrylate, 32.1 weight percent vinyl acetate having an inherent viscosity of 0.34.
2.

| Solvents employed, | % by weight | 3. Solvents employed % by Wt. |
|---|---|---|
| Methyl ethyl ketone | 15 | 20 |
| Methylisobutyl ketone | 20 | 17 |
| Isopropyl acetate | 6 | - |
| Butyl acetate | 8 | 6 |
| Ethanol | 10 | 12 |
| Toluene | 35 | 37 |
| Xylene | 6 | 8 |
| | 100 | 100 |

EXAMPLE 3

Use of the terpolymer with nitrocellulose in a reactive type furniture coating:

FORMULATIONS

| | A[1] % by weight, | B[3] dry basis |
|---|---|---|
| Vinyl Resin Modified RSNC 1/2 sec. | 30.0 | 50.0 |
| HPA modified resin[1] | 20.0 | - |
| Coconut alkyd resin | 40.0 | 40.0 |
| melamine-formaldehyde resin | 10.0 | 10.0 |
| Catalyst | 0.3 | 0.3 |
| Solids at 22 sec. 4 Ford Cup | 21.2 | 18.0 |
| Print Test: 1/2 psi, 4 hrs., 140°F. | No Print | No Print |
| 17 hour resistance to: | | |
| Toluene | No Effect | No Effect |
| Butyl Acetate | No Effect | Dissolved and Marred Surface |
| MEK | Slight mar on Surface | Severe mar Surface Lifted. |
| Nail Polish | Slight Mar | Slight Mar |

1. A terpolymer of 59 weight percent vinyl chloride, 8.9 weight percent beta-hydroxypropylacrylate, 32.1 weight percent vinyl acetate having an inherent viscosity of 0.34.
2. See footnote 2, example 2.
3. See footnote 3, example 2.

The polyurethanes described in the following examples were made in accordance with the following procedure:

To a 5 liter flask equipped with a stirrer, thermometer, reflux condenser, dry nitrogen purge and means of heating and cooling is charged the isocyanate (e.g. tolylene diisocyanate) and solvent. The polyol is added to the isocyanate at such a rate that the temperature does not exceed 55° C. After the polyol addition is complete, the temperature is increased to 80° C. and held for approximately five hours.

In the following examples the polyols were Niax Polyol PCP-0240 and PCP-0210, trademarks of Union Carbide Corporation, New York, N.Y. Both are formed by reacting caprolactone with a glycol. PCP-0240 has a molecular weight of 2,000 and PCP-0210 has a molecular weight of 850.

EXAMPLE 4

Prepolymers, as defined below, were made by the above procedure employing the following material. The properties of the respective prepolymers are tabulated below.

| Formulation | prepolymer I | prepolymer II | prepolymer III |
|---|---|---|---|
| NIAX Polyol PCP-0240 | 1.0 equiv. | - | 1.0 equiv. |
| NIAX Polyol PCP-0210 | - | 1.0 equiv. | - |
| Tolylene diisocyanate[1] | 2.0 equiv. | - | 2.0 equiv. |
| bis(4-isocyanatophenyl)-methane | - | 2.0 equiv. | - |
| Toluene | 25% | 25% | 25% |
| Typical properties | | | |
| Color, Gardner | <1.0 | <1.0 | <1.0 |
| Free NCO, % | 2.51 | 5.24 | 2.32 |
| Viscosity, cps. at 25°C. | 1000 | 5000 | 1000 |

1. Usual isomeric mixture of 2,4- and 2,6-tolylene diioscyanate.

| FORMULATION | A | B | C | D |
|---|---|---|---|---|
| Vinyl terpolymer resin[1] parts by weight | 25 | 25 | 25 | 25 |
| Prepolymer I, parts by weight | 26.5 | - | - | 15 |
| Prepolymer II, parts by weight | - | - | 26.5 | - |
| Prepolymer III, parts by weight | - | 26.5 | - | - |
| Amine, parts by weight[2] | 1.5 | 1.5 | 1.5 | - |
| Solvent (3), weight % | 65 | 65 | 65 | 65 |
| Cure at 80°C | 1 hour | 1 hour | 1 hour | 2 hours |
| pot life at Room Temperature | about 24 hours | about 24 hours | about 24 hours | about 30 hours |
| physical properties | | | | |
| Tentile strength, psi | 5000 | 8000 | 4160 | 4000 |
| Elongation, % | 475 | 295 | 460 | 260 |
| modulus, 100%, psi | 300 | - | 220 | - |
| modulus, 300%, psi | 640 | 2500 | 480 | 1200 |
| hardness, shore A | 82 | 90 | 84 | 90 |
| abrasion resistance, Mg[4] | 1.1 | - | 5.7 | - |
| adhesion (5) | excellent | excellent | excellent | excellent |

(1) 40% Solution in isopropylacetate of terpolymer of Example 1.
(2) 4,4'-Methylene-bis (2-chloroaniline) (MOCA)
(3) 50/50 weight blend of Toluene/methyl ethyl ketone
(4) Taber Abrasion, CS-17 Wheel 1000 gms, 3000 revolutions
(5) Tape Adhesion to poly(ethylene terephthalate) film

What is claimed is:

1. A terpolymer of vinyl chloride, vinyl acetate and an acrylic ester having the formula:

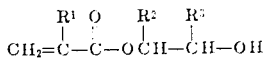

wherein R', R² and R³ may be hydrogen and methyl, in which the vinyl chloride mer content is about 50 to about 69 weight percent, based on the terpolymer weight, the acrylic ester mer content is about 2 weight percent to about 18 weight percent, based on the terpolymer weight, and the vinyl acetate mer content is at least 25 weight percent, based on the terpolymer weight, and said terpolymer has an inherent viscosity of about 0.15 to about 0.5, determined at 30° C. using 0.2 grams of the terpolymer in a deciliter of cyclohexanone.

* * * * *

UNITED STATES PATENT OFFICE
CERTIFICATE OF CORRECTION

Patent No. 3,755,271  Dated August 28, 1973

Inventor(s) Donald R. Montgomery

It is certified that error appears in the above-identified patent and that said Letters Patent are hereby corrected as shown below:

In the title; "RESN" should read --RESIN--. Column 1, in the title; "RESN" should read --RESIN--. Column 3, line 48; delete second appearing "No.". Column 5, line 2; "$A^1$" should read --$A^2$--.

Signed and sealed this 21st day of January 1975.

(SEAL)
Attest:

McCOY M. GIBSON JR.  C. MARSHALL DANN
Attesting Officer    Commissioner of Patents